United States Patent Office 2,875,969
Patented Mar. 3, 1959

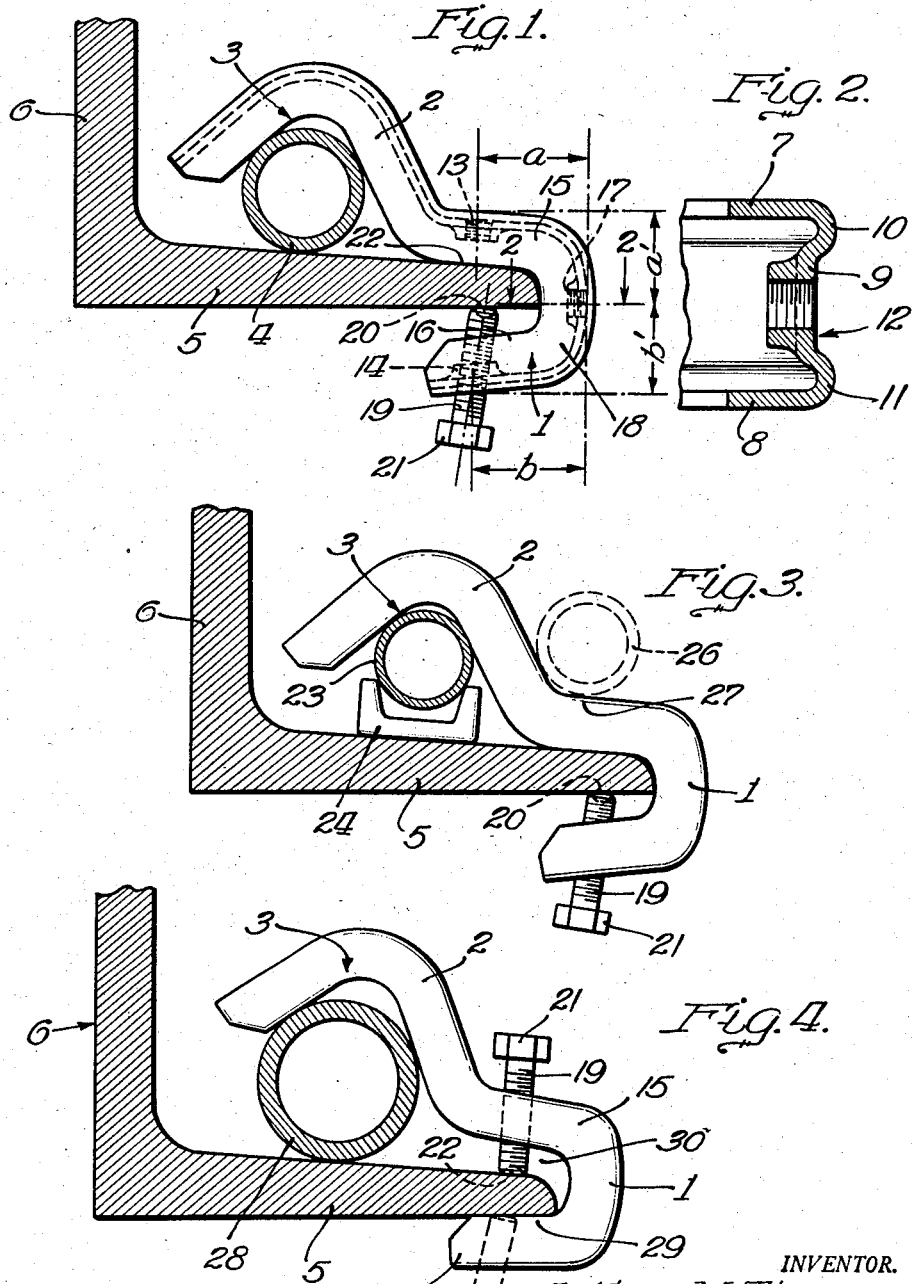

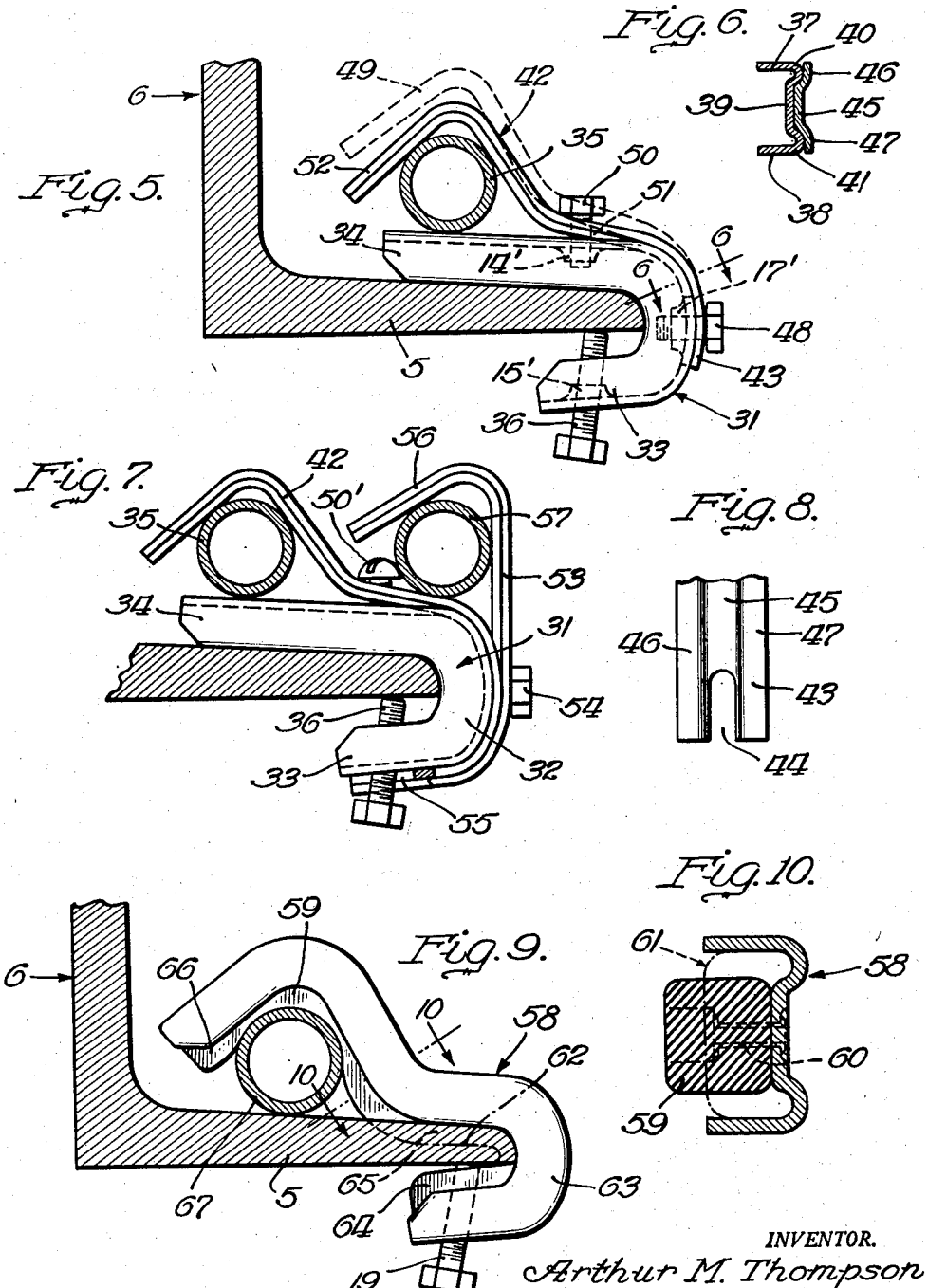

2,875,969

PIPE FASTENING MEANS

Arthur M. Thompson, Chicago, Ill.

Application May 12, 1953, Serial No. 354,466

3 Claims. (Cl. 248—72)

This invention relates to a fastener adapted for connecting an object to a flange or ledge of a structural building unit to secure such object in a given relation with respect to said structural member.

More specifically, the present invention is directed to a pipe fastener which is in the form of a C-clamp that engages over the edge of a flange of a structural building member, the C-clamp including contiguous means for engaging about a pipe to secure such pipe to the structural building member.

In securing pipe lines or other similar objects to a structural member such as an I-beam or channel of a building, it is not correct practice to drill holes or make other openings in such structural members in view of the fact that this method would weaken the structural unit. In fact, most city building codes prohibit such practice.

It is one of the main objects of the present invention to provide an efficient and readily attachable member which can be releasably secured to a building unit such as a flange of an I-beam or channel member or other like unit of a composite metal structure to securely connect a pipe line or other object to such structural unit.

It is another object of the present invention to provide a convenient clamp as an integral unit which has a combination clamping portion and an object retaining portion which are cooperatively arranged to accommodate different size objects.

It is another object of the present invention to provide a unit of this type which is formed as a channel construction wherein the end flanges are connected by a face web and wherein such flanges are positioned in the plane of stress of the particular clamp, thereby stabilizing the attaching member and rigidifying the structural material thereof.

It is a still further object of the present invention to provide a clamp of the type described wherein the web portion is recessed with respect to the flanged portion for the reception of auxiliary clamp structures which will conform to the contour of the clamp arrangement and nest within the recessed portion thereof when connected with such clamp. In this same general object it might be stated that applicant supplies spaced fastening units for the reception of fastening members that can be used both for connecting the clamp to a structural member and also for variably receiving the auxiliary clamps or brackets that are used in connection with this clamping means.

Another object of the present invention is to provide an object fastener of the kind described wherein a resilient liner is incorporated to provide a temporary gripping structure to hold the clamp upon a structural member while a permanent fastening means is actuated to secure the clamp to such member.

As a further object, the resilient means incorporated into the clamp is extended about the contour of the clamp and in a position to also be able to engage and retain an object in a given relation with respect to a structural member.

Other objects and advantages relating to the present invention shall hereinafter appear in the following detailed description having reference to the accompanying drawings forming a part of this specification.

In the drawings:

Figure 1 is a side elevational view of the fastening means of the present invention, this view illustrating the clamp secured to a flange of a structural member of a building and in engagement with a pipe to hold the latter against such a flange;

Figure 2 is a detail cross sectional view of the clamp structure per se substantially as viewed along the line 2—2 in Figure 1;

Figure 3 is a view similar to that shown in Figure 1 but illustrating one manner of utilizing this clamp to hold pipes of smaller diameter in fixed position with respect to the flange of the building member;

Figure 4 is another view of the same kind as Figures 1 and 3, but illustrating a still further arrangement whereby a pipe of a larger diameter is connected to the flange of the building member;

Figure 5 is a modified construction of clamp utilizing an extended auxiliary base to support the member being clamped and having in combination therewith an auxiliary bracket to hold the pipe upon the base;

Figure 6 is a transverse cross sectional view of the C-clamp portion of this fastening means taken substantially along the line 6—6 in Figure 5;

Figure 7 is another side elevational view of the modified clamp shown in Figure 5 but illustrating the use of multiple brackets in connection with this clamp;

Figure 8 is a small detail view of the face portion of one end of one of the auxiliary brackets;

Figure 9 is another modified construction of clamping means which is identical with the form illustrated in Figures 1, 3 and 4 but wherein a resilient liner has been connected with the clamp per se and within the channel portion thereof; and Figure 10 is a transverse cross sectional view taken substantially along the line 10—10 in Figure 9 to show further details of construction of this fastening means.

The form of the invention illustrated in Figures 1 to 4 inclusive comprises a C-clamp 1 and a contiguous extension 2 connected with one leg thereof and formed to provide an open sided jaw or a V-clamp section 3 constructed and arranged for engaging an object such as a conduit or pipe 4 to secure such pipe upon a flange 5 of a structural building element 6. The entire clamp is made of a predetermined configuration along the lines illustrated in Figure 1, and the body of the clamp per se comprises a continuous channel such as best illustrated in Figure 2 which channel has flanges 7 and 8 connected by a central web 9 with the junction portions between the flanges 7 and 8 and the web 9 comprising beaded edges 10 and 11. Thus the central outward portion 12 of the entire bracket is recessed and this follows along the entire length of this bracket. The flanges 7 and 8 are also positioned in parallel planes which are both normal to the active clamping stresses that are induced in this bracket when such member is secured to the flange 5 and over a pipe 4.

The C-clamp 1 is provided with threaded sleeves 13 and 14 in the coacting legs 15 and 16 of the C-clamp while a third threaded sleeve 17 is formed in the connecting portion 18 of such clamp.

As best shown in Figure 1, the distances a and b in a horizontal direction between the threaded sleeves 13 and 14 are substantially equal with respect to the position of the outer end of the threaded sleeve 17. Also, the distances a' and b' between the outer leg portions of the C-clamp in the threaded sleeves 13 and 14 and the axis of the threaded sleeve 17 are also equal. This provides a conversion feature with respect to the distances between the screws employed for securing the bracket to a flange and also as will later be explained, for connecting auxiliary brackets to such clamping means.

In the illustration shown in Figure 1, a single fastening screw 19 is threaded through the sleeve 14 and is provided with a cupped end 20 for biting into the surface metal of the flange 5. By tightening up the screw 19 through the hex head 21 and against the bottom of the flange 5, the surface portion 22 of the leg 15 of this C-clamp is tightly brought against and into contact with the upper surface of the flange 5. With the properly shaped V portion 3 and with the entire fastening means of a particular contour and also using the inherent spring of the metal per se in such clamp means, the object such as the pipe 4 will be firmly grasped within the V clamp portion 3 and against the upper surface of the flange 5.

The same clamp is illustrated in Figure 3 as engaging over a smaller diameter conduit 23 and in this particular arrangement, a short channel 24 is employed as a spacer between the upper surface of the flange 5 and the pipe 23. By employing various channel sections or similar spacing means such as 24, it is possible to anchor different diameter pipes against the flange 5. Attention is also directed to the broken line illustration of a pipe at 26 which can be carried within the inverted V portion 27 of the fastening means by employing suitable auxiliary brackets such as those which will be later explained in connection with Figures 5 and 7.

Figure 4 illustrates the same fastening structure in the form of the C-clamp 1 and the extension 2 but this arrangement shows how a larger diameter conduit 23 can be secured to the flange 5. Here the screw 19 has been threaded into the threaded sleeve 13 and brought into contact with the upper surface of the flange 5. This draws the surface 29 of the leg 16 of the C-clamp 1 into engagement with the under surface of the flange 5, thus creating a spaced relation at 30 between the leg 15 of the C-clamp and the flange 5. This obviously disposes the V-shaped portion 3 of the clamp a greater distance above the flange 5 whereby to readily accommodate a pipe such as shown at 28.

In the modified arrangement of fastening means comprising the clamp 31 shown in Figures 5 and 7, the C-clamp 32 comprises a short leg 33 and an extended leg 34. With this construction it is possible to use the leg 34 as an intermediate base upon the flange 5 for supporting an object or conduit such as the pipe 35 upon the upper surface of the base 34. The C-clamp 31 is secured in place through the set screw 36 and in all other respects the same construction is followed as in the form originally described. As shown in Figure 6, the C-clamp and leg extensions comprise the flanges 37 and 38 connected by a recessed web portion 39 with peripheral beads 40 and 41 interposed at the junctures of the flanges and the web.

With this arrangement it is feasible to employ an auxiliary bracket such as 42 which is provided with a slotted end as shown in Figure 8 at 43 having a slot 44, and this bracket is preferably made of resilient material having a limit spring throughout its length. It should also be noted as shown in Figures 6 and 8 that the auxiliary bracket has a depressed center at 45 with raised ledges 46 and 47 flanking the same. This provides a construction whereby the auxiliary bracket is nested within the recess in the C-clamp 31 and this prevents lateral weaving of the bracket with respect to the clamp. By using the same threaded sleeve arrangement 14', 15' and 17', it is possible to obtain different combinations of auxiliary bracket with the main C-clamp. In Figure 5 the bracket 42 with its slotted end 43 is endwise slipped over the securing screw 48 that threads into the threaded sleeve 17. In its normal shape this bracket 42 will then be approximately positioned as shown in the broken lines 49 in Figure 5. Then by using a second securing screw 50, the latter may be threaded into the threaded sleeve 14' through an opening 51 in the bracket 42 bringing the V-shaped end 52 of the bracket downwardly into the full line position and into fixed engagement with the pipe 35 to secure the latter to the C-clamp. In the Figure 7 illustration a second auxiliary bracket 53 is employed in this relation with respect to the bracket 42, and the entire two brackets are secured by a screw 54 that threads through a suitable opening 53 and into the threaded sleeve 17'. In this construction, the bracket 53 also has a slotted end as at 55 for straddling the securing screw 36 and the other end of bracket 53 has the V-shaped hook 56 which engages about a second object or pipe 57 carried over the C-clamp 32 and upon the bracket 42. In this particular arrangement, a round head screw 50' is used for clearance purposes, and in certain conditions of operation of the clamping units the screw 50' may be omitted in view of the fact that the securing screw 54 may adequately secure both brackets to the C-clamp 32.

In the modified arrangement shown in Figures 9 and 10, the C-clamp 58 is constructed identical with the form shown in Figure 1 but a resilient liner 59 is secured within the channel portion of the clamp through suitable rivets or other means such as 60. The resilient liner 59 is best illustrated in Figure 10 in the form of a square cross sectional unit which will appear substantially as shown in Figure 10 in its uncompressed form. When the clamp is brought into contact with the flange 5 of the structural member 6, the resilient liner 59 will compress into the broken line nested relation illustrated at 61 filling the channel portion of the C-clamp.

This liner will normally occupy the position illustrated by the dot and dash lines 62 as shown in Figure 9 in its unattached relation with respect to the flange 5. When the clamp is to be secured to the flange, the C-clamp portion 63 can be forced over the end of the flange with the resilient portions 64 and 65 tightly gripping the flange to hold the C-clamp 58 temporarily in position. Thereafter the operator can tighten the screw means 19 to fixedly secure the clamp to the flange 5.

It is also to be noted that the liner 59 is extended through the object holding portion of the clamp and terminates substantially at 66 coincident with the terminal end of the object holding section of the clamp. With this arrangement it is possible for the liner to also tightly engage an object or pipe such as 67 and as shown in Figure 9 for securing this pipe to a portion of the flange 5.

The foregoing description has been directed to several preferred constructions of the invention as specifically disclosed in the drawings. However, it is contemplated that certain changes may be made in the combination of elements shown and described and in the individual elements of the invention. However, all such modifications shall be governed by the breadth and scope of the appended claims directed to the invention.

What I claim is:

1. A pipe clamp comprising a resilient channel member having flanges and a web, said channel member having an integral pipe engaging jaw at one end, said jaw being of substantially V-shape and having diverging elements, and an integral support engaging jaw at its other end, said support engaging jaw being of substantially C-shape and having opposed legs joined by a bight portion, one of said legs joining one of said elements, the other of said legs terminating opposite the joint between said leg and element, said jaws having planes bisecting the angles between said legs and elements respectively and intersecting substantially at right angles, and a screw extending through said other of said legs of said support engaging jaw having an axis substantially parallel to and displaced from the bisecting plane of said pipe engaging jaw and inclined towards said bight portion with respect to said joint for securing said pipe to said support.

2. A pipe clamp as set forth in claim 1 wherein said legs of said support engaging jaws are divergent.

3. A pipe clamp as set forth in claim 1 wherein said flanges have opposed substantially rectilinear edges defining pipe engaging portions of said pipe engaging jaw.

References Cited in the file of this patent

UNITED STATES PATENTS

| Number | Name | Date |
|---|---|---|
| 339,072 | Nies | Mar. 30, 1886 |
| 1,233,223 | Hachmann | July 10, 1917 |
| 1,303,345 | McFeaters | May 13, 1919 |
| 1,399,461 | Childs | Dec. 6, 1921 |
| 1,774,878 | Fitzpatrick | Sept. 2, 1930 |
| 1,946,967 | Douglas | Feb. 13, 1934 |
| 2,163,635 | Shea | June 27, 1939 |
| 2,420,002 | McKay | May 6, 1947 |